(12) United States Patent
May

(10) Patent No.: US 6,928,923 B2
(45) Date of Patent: Aug. 16, 2005

(54) PISTON WITH SUPPORTING CONNECTOR ELEMENTS FOR A PISTON-CYLINDER ARRANGEMENT, IN PARTICULAR A SHOCK ABSORBER PISTON

(75) Inventor: Ewald May, Bonn (DE)

(73) Assignee: GKN Sinter Metals GmbH (DE)

( * ) Notice: Subject to any disclaimer, the term of this patent is extended or adjusted under 35 U.S.C. 154(b) by 127 days.

(21) Appl. No.: 10/645,725

(22) Filed: Aug. 21, 2003

(65) Prior Publication Data

US 2004/0079599 A1 Apr. 29, 2004

Related U.S. Application Data

(63) Continuation of application No. PCT/EP02/01769, filed on Feb. 20, 2002.

(30) Foreign Application Priority Data

Feb. 21, 2001 (DE) .......................................... 101 08 246

(51) Int. Cl.$^7$ ............................................... F16F 9/348
(52) U.S. Cl. .................................... 92/248; 188/322.18
(58) Field of Search .......................... 92/248, 249, 253; 188/322.15, 322.18

(56) References Cited

U.S. PATENT DOCUMENTS

| | | | |
|---|---|---|---|
| 2,240,644 A | 5/1941 | Focht | 188/88 |
| 2,912,069 A | 11/1959 | Dillenburger | 188/88 |
| 3,212,411 A | 10/1965 | Storms | 92/248 |
| 3,730,305 A | 5/1973 | Fouts | 188/322 |
| 4,591,033 A | 5/1986 | Taylor | 188/317 |
| 4,610,332 A | 9/1986 | Mourray | 188/322.15 |
| 4,821,850 A | 4/1989 | Geiling et al. | 188/315 |
| 5,070,971 A | 12/1991 | Dourson et al. | 188/317 |
| 5,520,092 A | 5/1996 | Iida et al. | 92/240 |
| 5,588,350 A | 12/1996 | Bowell, Sr. | 92/192 |
| 5,611,260 A | 3/1997 | Kanari et al. | 92/248 |
| 5,785,160 A | 7/1998 | Grundei | 188/322 |
| 6,591,948 B2 * | 7/2003 | Casellas et al. | 188/322.18 |
| 2002/0046651 A1 | 4/2002 | Casellas et al. | 92/248 |
| 2002/0056368 A1 | 5/2002 | May | 92/248 |

FOREIGN PATENT DOCUMENTS

| | | |
|---|---|---|
| DE | 34 29 474 A1 | 2/1986 |
| DE | 38 12 574 A1 | 10/1989 |
| DE | 90 17 933 | 10/1991 |

(Continued)

OTHER PUBLICATIONS

Worm, A.T., "Fluoroelasters DRIVING TOWARD THE FUTURE," *Machine Design; Seiten*, 1994, 66(11), 84–92.

Primary Examiner—Thomas E. Lazo
(74) Attorney, Agent, or Firm—Woodcock Washburn LLP

(57) ABSTRACT

A piston for a piston-cylinder arrangement, in particular a shock absorber piston exhibiting a piston body (6) provided with one peripheral web (12) protruding from the peripheral surface, disposed on said peripheral surface in both areas, each of which defining one end of the piston. Supporting connector elements (10), which extend longitudinally in the direction of the other end of the piston, are arranged successively at a distance from each other in a parallel manner contiguous to the peripheral web, whereby each two adjacent supporting connector elements (10) define a groove-shaped recess (11) and are provided with a collar-shaped seal (9) made of a thermoformable sealing material, which is formed on the piston body (6) in such a way that the peripheral webs (12) as well as the supporting connector elements (10) are incorporated into the material of the collar-shaped seal (9) over only a portion of their height.

7 Claims, 3 Drawing Sheets

FOREIGN PATENT DOCUMENTS

Figure 1:
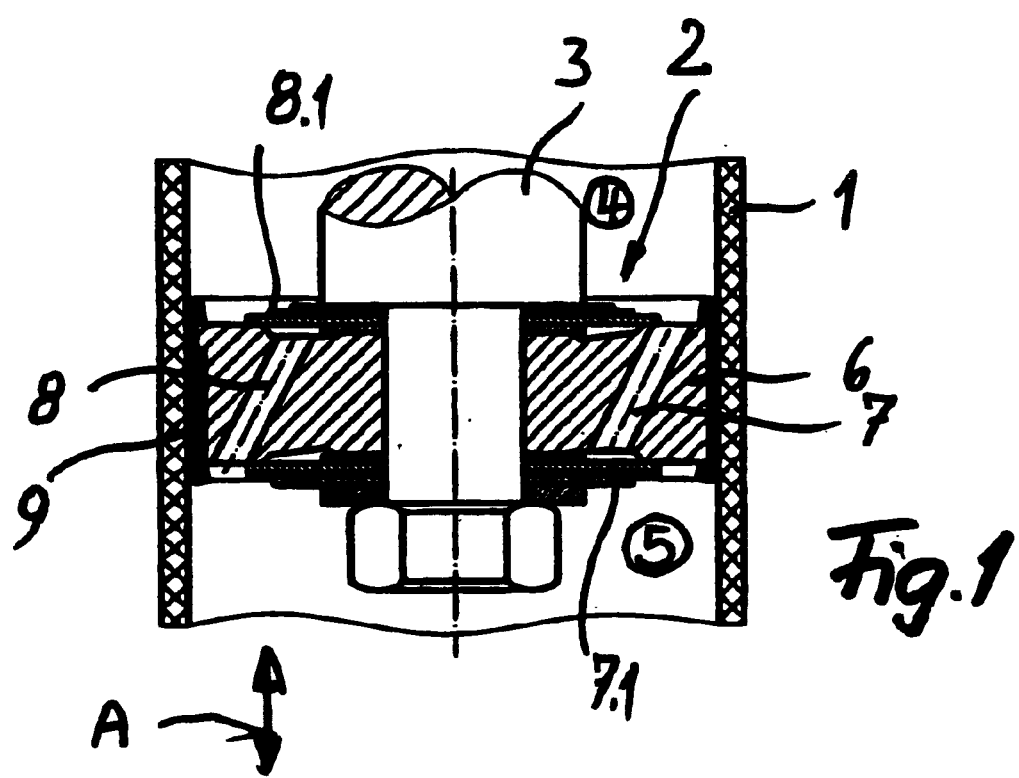

| | | |
|---|---|---|
| DE | 44 21 208 A1 | 12/1995 |
| DE | 44 21 968 A1 | 1/1996 |
| DE | 296 23 140 U1 | 1/1998 |
| DE | 197 07 633 | 7/1998 |
| DE | 198 47 341 A1 | 4/2000 |
| DE | 198 47 343 A | 4/2000 |
| DE | 198 47 342 A1 | 8/2000 |
| EP | 0 218 274 | 4/1987 |
| EP | 0 345 561 | 12/1989 |
| EP | 0 407 865 A2 | 1/1991 |
| EP | 0 557 548 A1 | 9/1993 |
| EP | 0 658 611 A1 | 6/1995 |
| EP | 0 682 190 B1 | 4/1998 |
| FR | 757515 | 12/1933 |
| FR | 2 481 969 | 11/1981 |
| GB | 686 705 | 1/1953 |
| GB | 2 072 797 A | 10/1981 |
| JP | 59 040066 | 3/1984 |
| JP | 60 141743 A | 7/1985 |
| JP | 60 245659 A | 12/1985 |
| JP | 61 025730 A | 2/1986 |
| JP | 61 082072 A | 4/1986 |
| JP | 61 116135 A | 6/1986 |
| JP | 61 116138 | 6/1986 |
| JP | 61 166137 | 7/1986 |
| JP | 61 221254 A | 10/1986 |
| JP | 62 015280 | 1/1987 |
| JP | 62 231725 | 10/1987 |
| JP | 03 074681 A | 3/1991 |
| JP | 05 262976 | 10/1993 |
| JP | 06 025499 | 2/1994 |
| WO | WO 00/34681 | 6/2000 |

\* cited by examiner

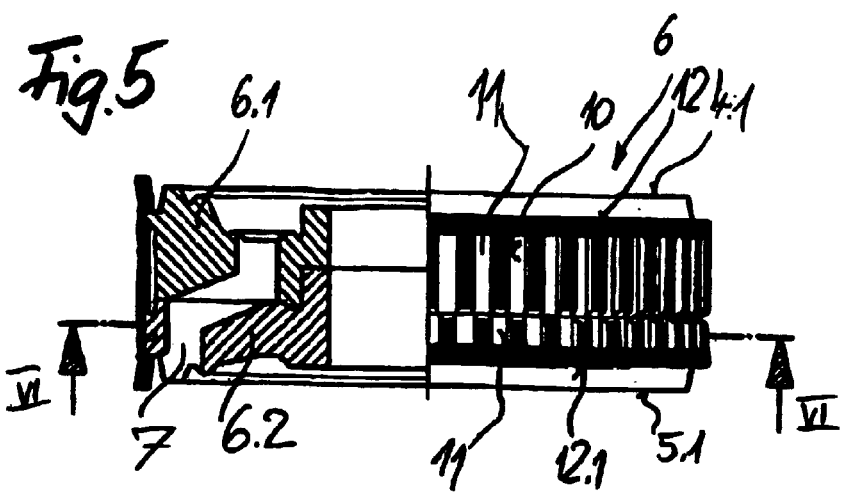
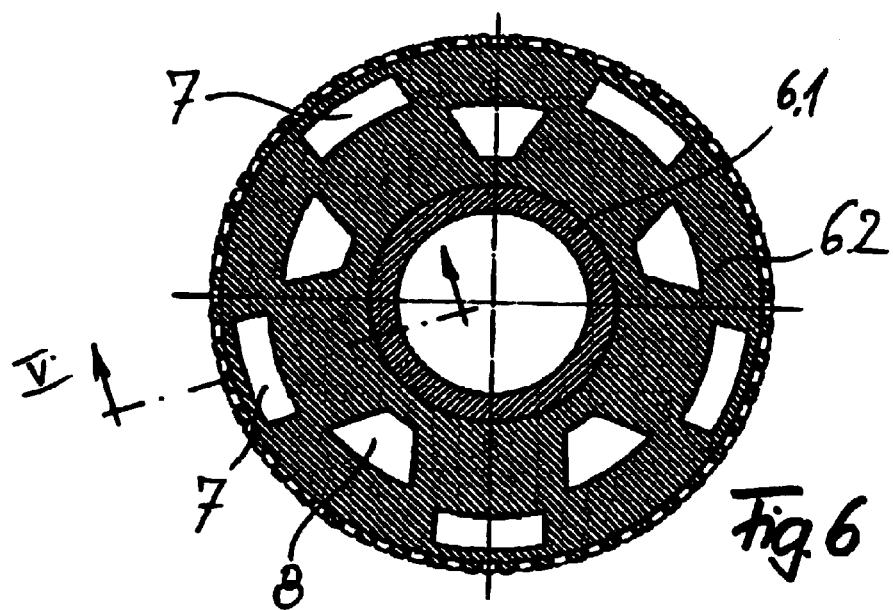
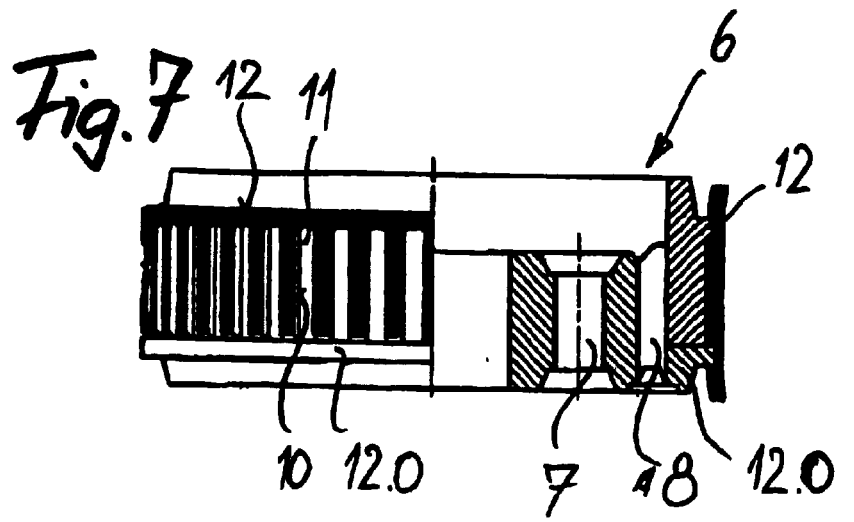

PISTON WITH SUPPORTING CONNECTOR ELEMENTS FOR A PISTON-CYLINDER ARRANGEMENT, IN PARTICULAR A SHOCK ABSORBER PISTON

This is a Continuation of Application No. PCT/EP02/01769 filed Feb. 20, 2002 in PCT which claims priority to German Application No. 101 08 246.0-12 filed Feb. 12, 2001.

There is a shock absorber piston known from EP-A-0 658 611, which has a piston body provided with a peripheral web at its peripheral surface. A number of webs running in the axial direction attach to this peripheral web on one side of it. A seal made of thermoplastic synthetic is sprayed onto this piston body in an injection molding process, whereby especially the webs extending in the axial direction and the grooves between them, which are filled in with sealing material, serve to reliably anchor the sealing material and to guide the piston. The seal applied by injection molding enables close tolerancing, which prevents "blow-by" and thus provides a reliable seal of the cylindrical spaces facing one another. The process to produce these types of injection-molded seals is relatively expensive.

There is a piston-cylinder arrangement known from U.S. Pat. No. 3,212,411, whose piston body has a number of peripheral grooves on its peripheral surface. To apply the seal, a cup-shaped preliminary mold made of PTFE (polytetrafluorethylene) is provided, which is first placed on the piston body loosely. The piston body so prepared is then pressed into a forming and calibrating cylinder that is heated to a high temperature, whereby under the influence of the heat, the PTFE material is pressed into the grooves on the peripheral surface of the piston body. Then, the piston body with the pressed-on seal is cooled in an appropriately designed cooling cylinder. The grooves are completely filled with the sealing material so as to provide a form-locked solid connection of the seal to the peripheral surface of the piston body. When used as a shock absorber piston, the bottom surface of the preliminary mold still overlapping the end surface of the piston body on one side must then be removed.

There is a shock absorber piston known from EP-A-682 190, whose only essential difference from the processes described above in its manufacture is in that to apply the seal, instead of a cup-shaped preliminary mold, a stamped circular sleeve is used. This circular sleeve is placed on one end of the piston body. The piston body prepared thusly is then pressed into a heated forming and calibrating cylinder, whereby the circular sleeve is placed around the peripheral surface of the piston body as a strip and then under the influence of heat pressed into the grooves running in the peripheral direction of the piston body. Then, the piston with its pressed-on seal is guided through a cooling tube. Here, as well, the sealing material fills the grooves practically completely so that the seal is solidly connected to the peripheral surface of the piston body in form-locked fashion.

The two processes described above show a disadvantage in that considerable pressures are required to shape and to press the sealing material into the grooves on the peripheral surface of the piston body. Also, the sealing material forming the seal is subject to strong shaping forces, which disadvantageously influence the structure of the sealing material.

There is a piston for a piston-cylinder arrangement, in particular a shock absorber piston known from DE-198 47 342 A, exhibiting a piston body provided with at least one peripheral web protruding from the peripheral surface, disposed on said peripheral surface in an area contiguous to one end of the piston. Supporting connector elements, which extend longitudinally in the direction of the other end of the piston, are arranged successively at a distance from each other in a parallel manner contiguous to the peripheral web, whereby each two adjacent supporting connector elements define a groove-shaped recess, are open in longitudinal direction at their ends opposing the peripheral web and provided with a collar-shaped seal made of a thermoformable sealing material, which is formed on the piston body in such a way that the peripheral web as well as the supporting connector elements are incorporated into the material of the seal at least over a portion of their height.

This previously known solution has shown, that in order to achieve a good sealing between the collar-shaped seal of the piston on the one hand and the inner wall of the cylinder on the other hand it is not necessary that the seal is adjacent to the total height of the piston body. Sufficient is, if the collar-shaped seal bases firmly in peripheral direction upon the relatively narrow peripheral web. Moreover, it has surprisingly turned out that to obtain a perfect and reliable bonding between seal and piston body, the groove-shaped recesses between the longitudinally running supporting connector elements must not be filled completely with sealing material, as this is known from EP-A-0 685 611.

It has further turned out for shock absorber pistons, on which the collar-shaped seal is formed in the way described in EP-A-682 190, that it is sufficient, if besides the peripheral web, the longitudinally running supporting connector elements are also incorporated into the material of the seal over only a portion of their height. On the one hand this effects an immaculate form fit between the collar-shaped seal and the piston body in longitudinal direction as well as in peripheral direction and on the other hand only a moderate deformation of the sealing material. This makes it not only possible to apply lower press capacities, but also causes a considerably lower flow of material during the deformation and thus practically avoids an unfavourable influencing of the material structure. Even, if the circular sleeve is deformed to such a degree that the groove-shaped recesses are completely filled, a deformation of the sealing material in cross direction is effected and thus a favourable "flow of material", which is caused by the moving of the piston body within the extension of the recess. Thus, a disadvantageous influencing of the material structure is avoided during this deformation, as well. As the supporting connector elements are only partially incorporated into the sealing material, the groove-shaped recesses between them are not completely filled. Thus, sufficient free space remains, into which the sealing material can escape, if it extends due to temperature increases. However, the piston is guided properly via the longitudinally running supporting connector elements. Hereby it is useful, if the longitudinal connector elements extend towards the end of the piston body.

The object of the invention is to provide for an improved piston, in particular a shock absorber piston.

This problem is solved, for example, according to an embodiment of the invention by means of a piston that is provided with one peripheral web protruding from the peripheral surface, disposed on said peripheral surface in both areas, each of which defining one end of the piston, and supporting connector elements, which extend longitudinally in the direction of the other end of the piston, arranged successively at a distance from each other in a parallel manner contiguous to the peripheral webs. Each two adjacent supporting connector elements define a groove-shaped recess and are provided with a collar-shaped seal made of a thermoformable sealing material, which is formed on the piston body in such a way that the peripheral webs as well as the supporting connector elements are incorporated into the material of the collar-shaped seal over only a portion of their height.

Further embodiments of the invention are mentioned in the following description of examples and sub claims.

Figure 2:
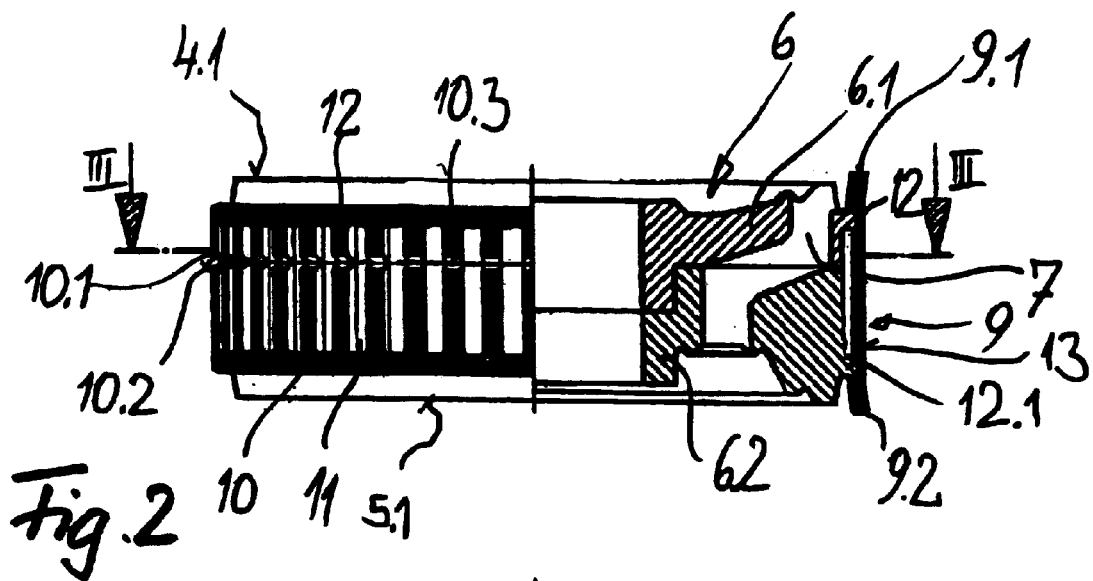
Figure 3:
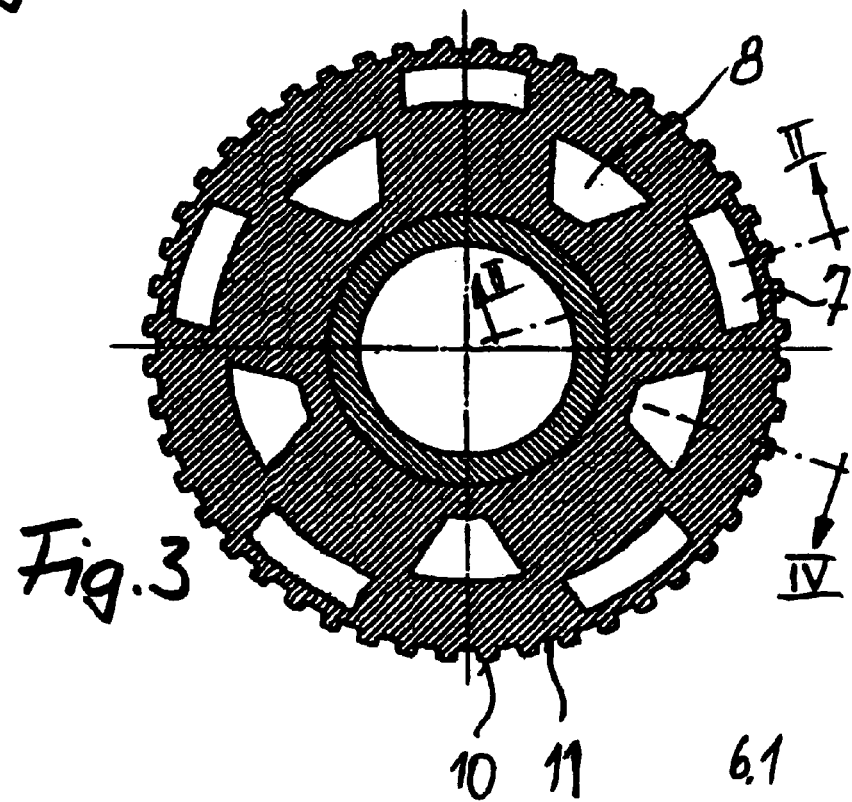
Figure 4:
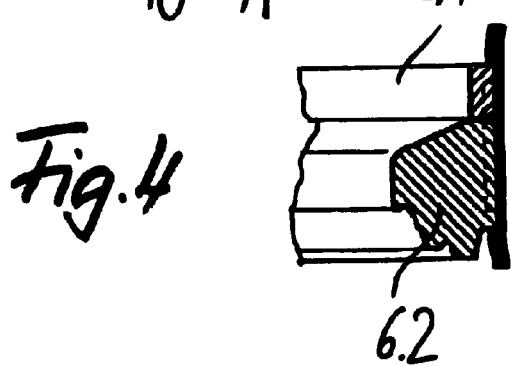

The invention is explained in more detail with the help of schematic drawings of an embodiment example. Shown are:

FIG. 1 a partial section in the axial direction through a piston-cylinder arrangement for a shock absorber, FIG. 2 a side view, partially in a section, of a piston for a shock absorber in a first embodiment, FIG. 3 a horizontal section through the piston according to the line III—III shown in FIG. 2 without collar-shaped seal, FIG. 4 a partial section according to the line IV—IV shown in FIG. 3, FIG. 5 a side view, partially in a section, of a piston in a second embodiment, FIG. 6 a horizontal section through the piston according to the line VI—VI shown in FIG. 5, FIG. 7 an embodiment with a peripheral web in the form of an attached ring.

FIG. 1 shows as a function diagram an axial section through a shock absorber, which connects two parts that are movable relatively to one another, as for example a vehicle axis and a vehicle frame. The shock absorber has a cylindrical part 1, which is connected to one of the two parts that are movable relatively to each other. Within the cylinder 1 a piston 2 is guided, which is fixed to a piston rod 3, the free end of which is connected to the other part of the two parts that are movable relatively to each other. Hereby, the cylinder 1 is closed on both sides and filled with a hydraulic fluid, so that the piston-cylinder arrangement is designed to be dualacting, with the piston separating two cylinder spaces 4, 5 from one another.

The piston body 6 of the piston 2 has a number of penetration channels 7, 8, running alongside one another. A throttle valve 7.1 and 8.1 covers the exit side of each of the penetration channels 7, 8, the function of which is yet to be explained. This arrangement is designed such that a number of penetration channels 7 and a number of penetration channels 8 are arranged alternating around the cylinder axis.

The peripheral surface of the piston 2 is equipped with a collar-shaped seal 9, which seals off cylinder space 4 against cylinder space 5. When the piston 2 moves into the cylinder space 4, the fluid is pressed through the penetration channels 7 against the return force of the throttle valves 7.1. Hereby, the penetration openings 8 are held shut by the pressure of the fluid space 4 acting on the throttle valves 8.1. When the piston 2 moves in the reverse direction, the penetration channels 7 are closed by the throttle valves 7.1, while the fluid can flow back through the penetration channels 8 from cylinder space 5 into cylinder space 4.

FIG. 2 shows a side view of an embodiment of the piston 2 according to the invention in FIG. 1 without the arrangement of the throttle valves 7.1 and 8.1. The view according to FIG. 3 shows a piston 2 without the seal 9, to show the structure of the peripheral surface of the piston. The partial section presented in FIG. 2 shows the piston with the seal 9.

The piston body 6 is provided with a number of longitudinally running supporting connector elements 10 on its peripheral surface, each of which defining corresponding groove-shaped recesses 11. In the embodiment example shown here, the groove-shaped recesses are arranged such that they extend from one of the end surfaces to which a first peripheral web 12 is allocated, e.g. the end surface 5.1 of the piston body 6, up to a second peripheral web 12.1, which runs at the other end of the piston body 6 in the area near or at the end surface 4.1 contiguous in peripheral direction and defines the groove-shaped recesses 11 at this end of the piston. The peripheral webs 12 and the longitudinally running supporting connector elements, forming an outer surface of the piston body 6, have the same level. For reasons of a better representation the outer surface is marked with a hatch. The supporting connector elements and correspondingly the grooves 11 can, as shown, run parallel to the axis and be adjusted under an angle to the motional axis of the piston 2.

The collar-shaped seal 9 arranged on the periphery of the piston body 6 consists of a thermoplastic synthetic material, preferably PTFE. In the embodiment example shown here, the collar-shaped seal 9 was formed onto the piston body 6 by heat forming.

In the heat forming process of the sealing material consisting of a previously ready-made circular sleeve or a previously ready-made piece of tube, the supporting connector elements 10 and the peripheral webs 12 are incorporated into the material of the collar-shaped seal 9 over only a portion of their height, so that a certain amount of free space remains between the material of the seal 9 and the bottom of the groove-shaped recesses 11. This allows the sealing material to freely flow into the groove 11 without being squeezed when the seal 9 is formed. In this shaping process, the cylindrical exterior surface 13 of the seal 9 is simultaneously calibrated so that the desired tolerances to the inner diameter of the cylinder 1 can be maintained. Since the overall system heats up during operation, especially when these piston-cylinder arrangements are used as shock absorbers, this remaining free space in the base of the groove also allows the sealing material to expand into the groove within certain limits so that the wear of the seal on the peripheral surface of the seal 9 adjacent to the edges is reduced. The piston 2 is supported over its complete height and practically stable. The seal 9 is supported at the grooves' ends inside the corresponding peripheral web 12.

FIG. 3 shows a horizontal section through the piston 2 according to the line III—III in FIG. 2 with removed seal 9, so that the structure of supporting connector elements 10 and grooves 11 can be seen.

FIGS. 2 and 3 as well as the representation of the piston 2 in the partial longitudinal section according to FIG. 4 show that the collar-shaped seal 9 is formed on the piston body in such a way that the peripheral webs 12 as well as the longitudinally running supporting connector elements 10 are incorporated into the material of the seal at least over a portion of their height, so that at each of the groove-shaped recesses 11 a small free space remains between the inner surface of the collar-shaped seal 9 and the bottom of the groove-shaped recesses 11 (right side of FIG. 2). However, the longitudinally running supporting connector elements 10 are throughout covered by the collar-shaped seal in the same thickness as the peripheral webs 12. The edges 9.1 and 9.2 of the seal 9 standing away and lying barely opposite the piston body 6 have the effect, that each of these extends slightly and improves the sealing between piston and cylinder wall, when the seal 9 is pressurized. Depending on the operational conditions it may be sufficient to provide only one away-standing edge of the seal 9.

To be able to produce such a groove-web-arrangement, which is at its end surfaces defined by the peripheral webs 12 and 12.1 cost-efficiently, it is useful, to produce at least one of the peripheral webs 12 and 12.1 as a special ring 12.0 and to push it onto the piston body 6 as a web-shaped boundary of the grooves 11, after the piston body 6 has been shaped, as this is shown in FIG. 7. However, it is also possible to produce a piston body, which has only the longitudinally running supporting connector elements and to push a ring provided with a peripheral web onto each end surface of this piston body.

Such a piston body 6 can preferred be formed from one, but in particular from two element sections 6.1 and 6.2 produced through powder metallurgy. The element sections 6.1 and 6.2 are pressed from a sinterable metallurgical powder. The pressed and sintered element sections are then put together in an assembly operation. Subsequently, the assembled molding is calibrated, so that both element sections 6.1 and 6.2 are bonded firmly to one another. This process can also be applied to the afore mentioned design with ring 12.0. The design of such geometries can be realised by using cost-saving tools.

In order to improve the shearing capacity of the bond between piston 2 and seal 9, the ends facing each other 10.1 and 10.2 of the web parts, which are allocated to each of the element sections 6.1 and 6.2, are chamfered, so that each of the webs 10 in this area is interrupted. When the material of the seal 9 is molded, especially thermoformed, it is molded into the interruption such that referring the moving direction of the piston 2 (double arrow A in FIG. 1) an additional form closure area develops in the form of a so-called clutch. In this area the seal is formed through practically up to the bottom of the shock groove defined by chamfers 10.1 and 10.2.

The embodiment of the invention represented in FIG. 5 and FIG. 6 corresponds in its construction and function to the embodiment according to FIGS. 2, 3 and 4. The difference in this embodiment is in that the two element sections 6.1 and 6.2 are joined staggered around a groove splitting of the grooves 11 and thus the section stressed by shearing of the sealing material, which is formed into the groove areas now being allocated staggered towards one another, is extended.

However, when designing an element section, this groove staggered has to be taken into account regarding the run of the channels 7 and 8. In case of this embodiment it is also useful, if the ends facing each other of the supporting connector elements 10 are chamfered or rounded off.

What is claimed is:

1. A piston for a piston-cylinder arrangement, in particular a shock absorber piston exhibiting a piston body (6) provided with one peripheral web (12) protruding from the peripheral surface, disposed on said peripheral surface in both areas, each of which defining one end of the piston, and supporting connector elements (10), which extend longitudinally in the direction of the other end of the piston, arranged successively at a distance from each other in a parallel manner contiguous to the peripheral webs, whereby each two adjacent supporting connector elements (10) define a groove-shaped recess (11) and are provided with a collar-shaped seal (9) made of a thermoformable sealing material, which is formed on the piston body (6) in such a way that the peripheral webs (12) as well as the supporting connector elements (10) are incorporated into the material of the collar-shaped seal (9) over only a portion of their height.

2. Piston according to claim 1, characterised in that the collar-shaped seal (9) has at least one edge standing away and lying barely opposite the peripheral area of the piston body (6).

3. Piston according to claim 1, characterised in that the piston body (6) is produced through powder metallurgy.

4. Piston according to one of the claims 1 to 3, characterised in that the piston (6) is divided into two element sections (6.1, 6.2) in a dividing level provided diagonally to the axis. These two element sections (6.1, 6.2) are connected and firmly bonded with one another, whereby at least one element section (6.1, 6.2) has a peripheral web (12, 12.1) with contiguous supporting connector elements (10.1, 10.2) and is provided with an element section (6.2) having a groove-shaped recess (11) defined by a peripheral web.

5. Piston according to claim 4, characterised in that the two element sections (6.1, 6.2) are joined staggered against one another around a breadth of the supporting connector elements (10).

6. Piston according to claim 2, characterised in that the collar-shaped seal (9) is made of PTFE as a thermoformable plastic.

7. Piston according to claim 6, characterised in that the collar-shaped seal (9) is pressed on with its outer surface being calibrated, at least in its area covering the webs (10, 12).

* * * * *